United States Patent
Lytle et al.

(10) Patent No.: US 9,339,826 B2
(45) Date of Patent: May 17, 2016

(54) LOW-PROFILE ROLLING SPRAY APPLICATOR

(75) Inventors: Jon Lytle, Comstock Park, MI (US);
Derek Westerbur, Howell, MI (US);
Amber Ferguson, Swartz Creek, MI (US)

(73) Assignee: CHEM-TREND L.P., Howell, MI (US)

( * ) Notice: Subject to any disclaimer, the term of this patent is extended or adjusted under 35 U.S.C. 154(b) by 312 days.

(21) Appl. No.: 13/568,764

(22) Filed: Aug. 7, 2012

(65) Prior Publication Data
US 2014/0044867 A1  Feb. 13, 2014

(51) Int. Cl.
| | |
|---|---|
| B29C 33/58 | (2006.01) |
| B05B 3/18 | (2006.01) |
| B05B 1/20 | (2006.01) |
| B05B 9/00 | (2006.01) |
| B05B 13/00 | (2006.01) |
| B05B 13/02 | (2006.01) |
| B05B 13/04 | (2006.01) |
| B05B 13/06 | (2006.01) |
| B05B 15/06 | (2006.01) |

(52) U.S. Cl.
CPC . *B05B 1/20* (2013.01); *B05B 9/007* (2013.01); *B05B 13/005* (2013.01); *B05B 13/0207* (2013.01); *B05B 13/04* (2013.01); *B29C 33/58* (2013.01); *B05B 13/0627* (2013.01); *B05B 15/06* (2013.01)

(58) Field of Classification Search
USPC .......... 118/313, 323; 239/726, 727, 739, 741, 239/743
See application file for complete search history.

(56) References Cited

U.S. PATENT DOCUMENTS

| | | | |
|---|---|---|---|
| 2,572,142 A | 10/1951 | Hartenbach, Jr. | |
| 2,581,678 A | 1/1952 | Malin et al. | |
| 2,995,307 A | 8/1961 | McMahon | |
| 3,118,607 A | 1/1964 | Rocher | |
| 3,237,346 A | 3/1966 | Watts | |
| 3,508,709 A | 4/1970 | Small et al. | |
| 3,765,810 A * | 10/1973 | Smarook | 425/110 |
| 4,011,994 A | 3/1977 | Lenz | |
| 4,602,742 A | 7/1986 | Penson | |
| 4,638,948 A | 1/1987 | Marlek | |
| 4,739,933 A | 4/1988 | Hanano | |
| 4,793,559 A | 12/1988 | Marlek | |
| 5,865,549 A * | 2/1999 | Kinard et al. | 401/48 |
| 5,935,657 A | 8/1999 | Melendez | |
| 6,059,476 A | 5/2000 | Brugger | |
| D649,358 S | 11/2011 | Bruno et al. | |

* cited by examiner

*Primary Examiner* — Alexander Weddle
(74) *Attorney, Agent, or Firm* — Harness, Dickey & Pierce, P.L.C.

(57) ABSTRACT

A rolling spray applicator has a low profile so that it can be utilized between closely spaced upper and lower surfaces so that a spray coating can be applied thereto simultaneously. The spray applicator includes an elongated spray bar including a plurality of nozzles on upper and lower surfaces thereof. A fluid supply is connected to the elongated spray bar. A frame supports the elongated spray bar and includes a plurality of wheels for rollingly supporting the frame. A handle is attached to either one of the frame or the elongated spray bar so that the device can be rolled between closely spaced upper and lower surfaces for applying a spray coating thereon.

14 Claims, 1 Drawing Sheet

LOW-PROFILE ROLLING SPRAY APPLICATOR

FIELD

The present disclosure relates to a spray applicator and more particularly to a low-profile rolling spray applicator.

BACKGROUND

This section provides background information related to the present disclosure which is not necessarily prior art.

The use of a release agent on the surface of a press or mold cavity is common to allow a workpiece to be removed from the press or mold cavity without sticking to the surface thereof. Accordingly, release agents are commonly sprayed on the surface using various sprayers and other techniques. A problem in the art exists when the size of the press surfaces are extremely large and in close proximity to one another even in a fully opened state. Accordingly, it is desirable to provide a method and device for applying a release agent to the surface of a large press that requires the application of the release agent on upper and lower surfaces thereof.

SUMMARY

This section provides a general summary of the disclosure, and is not a comprehensive disclosure of its full scope or all of its features.

The present disclosure provides a low-profile rolling spray applicator that includes an elongated spray bar including a plurality of nozzles on upper and lower surfaces thereof with a fluid supply connected to the elongated spray bar. A frame supports the elongated spray bar and includes a plurality of wheels that support the frame as well as a handle attached to the frame to allow the rolling spray applicator to be rolled inside of a large press while the nozzles of the elongated spray bar spray a release agent or other fluid onto the upper and lower surfaces simultaneously as the spray applicator is rolled from one end of the press to another.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
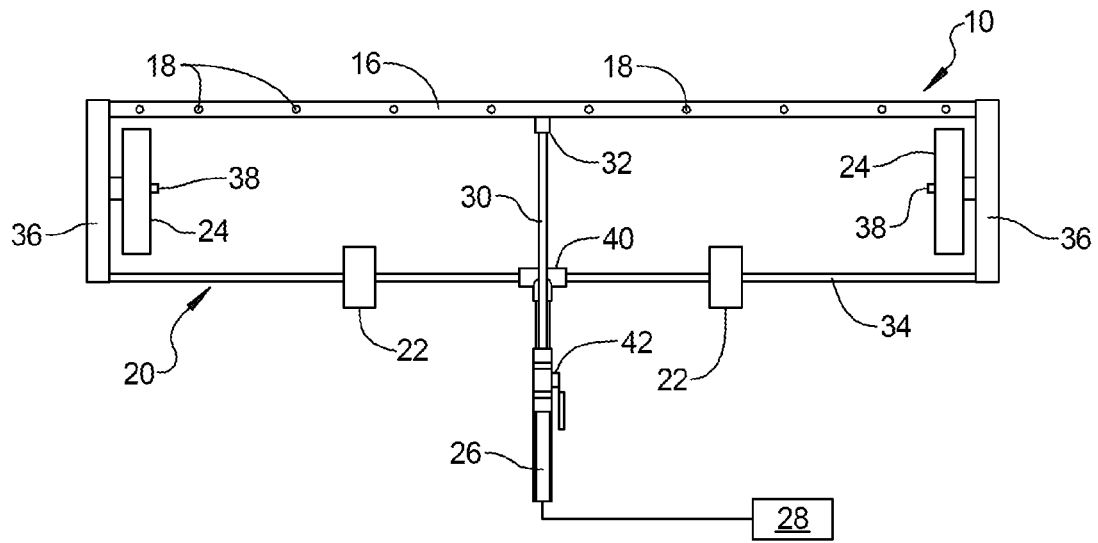
FIG. 1 is a top plan view of the low-profile rolling spray applicator according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90° or at other orientations) and the spatially relative descriptors used herein interpreted accordingly.

Figure 2:
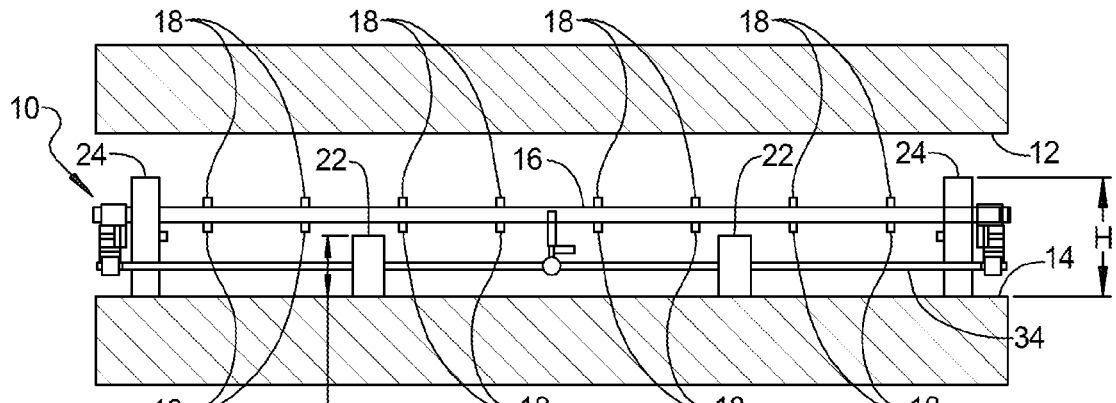
FIG. 2 is a front plan view of the low-profile rolling spray applicator shown in FIG. 1.
Figure 3:
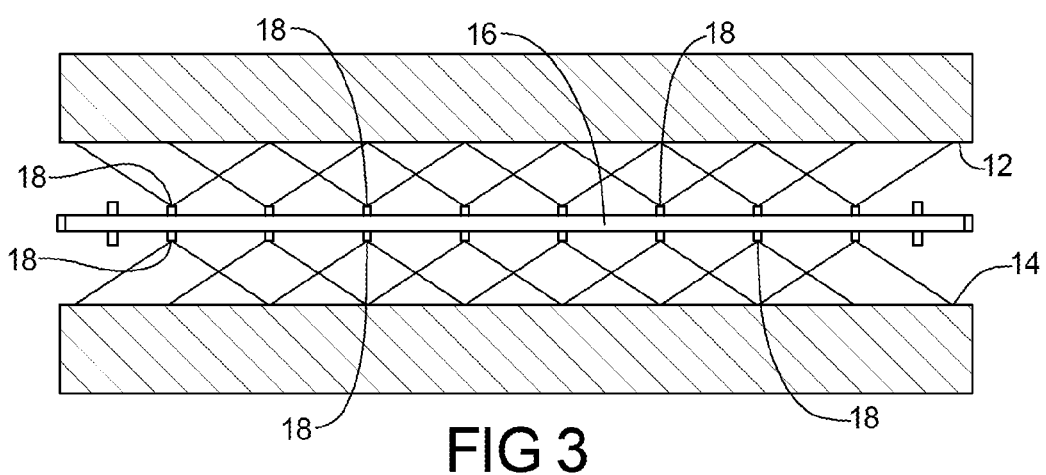
FIG. 3 is a schematic illustration of the spray pattern from the nozzles of the rolling spray applicator for applying a spray to an upper and lower surface simultaneously according to the principles of the present disclosure.

With reference to FIGS. 1-3, the low-profile rolling spray applicator 10 according to the principles of the present disclosure will now be described. The low-profile rolling spray applicator 10 is designed to be utilized for spraying a release agent or other fluid such as a lubricant, coating, primer, paint, or other fluid onto upper and lower surfaces simultaneously within a press, mold, or other tightly configured space such as the upper and lower surfaces 12, 14, as illustrated in FIGS. 2 and 3.

The low-profile rolling spray applicator 10 includes an elongated spray bar 16 including a plurality of nozzles 18 disposed along the upper and lower sides of the spray bar 16. A frame 20 supports the elongated spray bar 16 and includes a plurality of wheels or other rollers 22, 24 supporting the frame 20. An elongated handle 26 is attached to either or both of the elongated spray bar 16 and the frame 20. The handle 26 can be made from plastic or metal and can be expandable/retractable. A fluid supply including a vessel 28 and hose 30 can be connected to the elongated spray bar 16 by a fitting 32. The vessel 28 can be pressurized or provided with a pump and can be filled with fluid release agent, lubricant, coating, primer, or paint, by way of example.

The frame 20 can include an axle 34 that supports one or more wheels 22 thereon and is rotatably supported at its ends by a pair of side struts 36 that are connected between the axle 34 and the elongated spray bar 16. Additional wheels 24 can be mounted to the side struts 36 by an axle shaft 38. It is noted that the wheels 22, 24 can be the same or different sized and can have diameters ranging from less than one to several inches depending upon the opening of the specific press being coated. It should be understood that the frame can take on many forms and is designed to support the spray bar 16 for rolling movement on wheels or rollers.

In the embodiments shown, the handle 26 is connected to the axle 34 by a swivel T and can be secured at a generally mid-location along the axle by rail fittings.

The low-profile rolling spray applicator 10 is designed to have a low profile such that a maximum height profile H of the rolling spray applicator 10 can be defined by a height of the wheels 24 that are attached to the side struts 36, or alternatively, does not exceed two times a height h of the wheels 22. The nozzles 18 are arranged along the upper and lower surfaces of the elongated spray bar 16 to provide an overlapping spray pattern as illustrated in FIG. 3 such that adjacent upper and lower spray nozzles 18 have a spray pattern that overlap with one another to provide a uniform coating. Thus, an even spray pattern over the upper and lower surfaces 12, 14 of a press, mold cavity, or other closely spaced opposing surfaces can be provided. It is intended that the spacing of the elongated spray bar 16 can be adjusted so that it is approximately located midway between the upper and lower surfaces 12, 14. Furthermore, the handle 26 is elongated, and can be extendable/retractable so as to allow a greater range of travel between the upper and lower surfaces 12, 14. It is anticipated that surfaces that are 20 feet long or longer can be coated by the rolling spray applicator 10, according to the principles of the present disclosure.

In operation, the vessel 28 containing the release agent or other fluid to be applied to the surfaces 12, 14 can be pressurized or provided with a pump and one or more control valves 42 can be disposed along the hose or other conduit 30 and can be opened to supply the pressurized fluid to each of the nozzles 18 along the spray bar 16. According to a test arrangement, sixteen spray nozzles having a spraying angle of 110° as well as four end nozzles having a spraying angle of approximately 80° were threaded onto an elongated PVC spray bar although metal pipes could be used. It should be understood that more or fewer spray nozzles can be used depending upon the specific application. The nozzles can be used to apply several gallons per minute of release agent to each surface 12, 14, simultaneously in a single application. The release agent can be applied in close proximity to the surfaces while reaching and evenly coating places on the surfaces 12, 14 with very little effort and time in comparison to standard means.

It is noted that the wheels 22, 24 can be made from glass-filled nylon that can resist temperatures of up to 425° F. It is noted that the size of the components of the rolling spray applicator can be dependent upon the specific desired application. In the tested embodiment, the elongated spray bar was approximately five feet long and ¾ inch in diameter and the side struts 36 were made from 1⅝ inch square strut channeling. The length of the spray bar may range from less than three to greater than ten feet to facilitate coverage of the size range of press platens known to date.

The low-profile rolling spray applicator 10 allows a very uniform coating to be applied to both top and bottom platens 12, 14 in a press with limited accessibility, and it can be accomplished efficiently without a lot of setup, labor, or time required to do it.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A rolling spray applicator; comprising:
an elongated spray bar having a first end and a second end and a first side extending from the first end to the second end and a second side extending from the first end to the second end, the first side including a plurality of nozzles facing in a first direction and the second side including a plurality of nozzles facing in an opposite direction to the first direction, a fluid supply connected to said elongated spray bar;
a frame supporting said elongated spray bar, said frame including a plurality of wheels supporting said frame; and
a handle attached to one of said frame and said elongated spray bar.

2. The rolling spray applicator according to claim 1, wherein said frame includes an axle supporting at least one wheel thereon.

3. The rolling spray applicator according to claim 2, wherein said frame includes a pair of side struts connected between said axle and said elongated spray bar.

4. The rolling spray applicator according to claim 3, wherein said pair of side struts each support one of said plurality of wheels thereon.

5. The rolling spray applicator according to claim 4, wherein said wheels supported by said pair of side struts define a maximum height profile of said rolling spray applicator.

6. The rolling spray applicator according to claim 3, wherein said axle is parallel to said elongated spray bar.

7. The rolling spray applicator according to claim 2, wherein said handle is attached to said axle.

8. The rolling spray applicator according to claim 1, wherein said rolling spray applicator has a maximum height profile no greater than twice a height of said plurality of wheels.

9. The rolling spray applicator according to claim 1, wherein said handle is extendable.

10. The rolling spray applicator according to claim 1, wherein said fluid supply includes a hose connected to said elongated spray bar and to a vessel containing a fluid.

11. The rolling spray applicator according to claim 10, wherein said vessel is pressurized.

12. The rolling spray applicator according to claim 1, wherein said frame includes a pair of side struts connected to said elongated spray bar.

13. The rolling spray applicator according to claim 12, wherein said plurality of wheels are mounted to said pair of side struts.

14. A method of coating upper and lower platens of a press, comprising:
   supporting a spray bar generally between said upper and lower platens, said spray bar having a plurality of spray nozzles on an upper and a lower surface thereof;
   supplying a pressurized coating fluid to said spray bar to be sprayed out of said plurality of nozzles; and
   moving said spray bar along a length of said press to apply said coating fluid simultaneously to said upper and lower platens.

* * * * *